US010495959B2

(12) United States Patent
Chen et al.

(10) Patent No.: US 10,495,959 B2
(45) Date of Patent: Dec. 3, 2019

(54) PROJECTOR AND ILLUMINATION SYSTEM THEREOF

(71) Applicant: Coretronic Corporation, Hsin-Chu (TW)

(72) Inventors: Chang-Hsuan Chen, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/383,685

(22) Filed: Apr. 15, 2019

(65) Prior Publication Data

US 2019/0317389 A1 Oct. 17, 2019

(30) Foreign Application Priority Data

Apr. 17, 2018 (CN) ..................... 2018 2 0542716 U

(51) Int. Cl.
*G03B 21/20* (2006.01)
*G03B 21/00* (2006.01)
*G02B 27/14* (2006.01)

(52) U.S. Cl.
CPC ........ *G03B 21/2013* (2013.01); *G02B 27/141* (2013.01); *G03B 21/005* (2013.01); *G03B 21/2033* (2013.01); *G03B 21/2066* (2013.01)

(58) Field of Classification Search
CPC .............. G03B 21/2013; G03B 21/005; G03B 21/2033; G03B 21/2066; G02B 27/141
See application file for complete search history.

(56) References Cited

U.S. PATENT DOCUMENTS

| 2009/0268168 | A1 | 10/2009 | Wang | |
|---|---|---|---|---|
| 2016/0041457 | A1* | 2/2016 | Oh | G03B 21/204 |
| | | | | 353/31 |
| 2017/0139311 | A1* | 5/2017 | Nagase | G02B 26/0833 |
| 2018/0239230 | A1* | 8/2018 | Pettitt | G03B 21/005 |

FOREIGN PATENT DOCUMENTS

| CN | 107463057 A | 12/2017 |
|---|---|---|
| TW | 200742868 A | 11/2007 |
| TW | 200916824 A | 4/2009 |

* cited by examiner

*Primary Examiner* — Anne M Hines

(57) ABSTRACT

A projector and an illumination system are provided. A first light source module and at least one second light source module of the illumination system provide the first color beams and the second color beams respectively. The first light source module includes a first integrating element, a second integrating element, a plurality of first light emitting elements for providing a plurality of first sub-beams, a plurality of second light emitting elements for providing a plurality of second sub-beams, and a plurality of third light emitting elements for providing a plurality of third sub-beams. Each integrating element has a plurality of light reflecting regions and a plurality of light transmitting regions. The light transmitting regions of each integrating element are alternately arranged between the light reflecting regions of the corresponding integrating element.

16 Claims, 12 Drawing Sheets

PROJECTOR AND ILLUMINATION SYSTEM THEREOF

CROSS-REFERENCE TO RELATED APPLICATION

THIS APPLICATION CLAIMS THE PRIORITY BENEFIT OF CHINA APPLICATION (CN201820542716.8 FILED ON 2018 Apr. 17). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to an illumination system, and more particularly to an illumination system for a projector.

BACKGROUND OF THE INVENTION

At present, projectors using lasers as a light source are becoming more and more popular in the high-end projector market, and at the same time, the projectors are expected to have higher brightness. In order to achieve higher brightness, the necessary trend is to arrange more light source elements in the projector. Due to the limitation of the arrangement, the light source elements are clustered and disposed in two different directions. The light beams emitted from the light source elements are collected by the light combiner to be introduced into the light combining system of the projector. With the different models of the projectors, the mechanical design is limited by the size of the overall casing, which results many problems: 1. the structure and the manufacturing method of the illumination system are complicated; 2. the manufacturing cost is high; 3. the manufacturing tolerance is large.

Therefore, how to avoid the above problems is the focus of attention of relevant personnel in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a projector that has good imaging quality.

Another objective of the invention to provide an illumination system that has good imaging quality.

Other objectives and advantages of the invention can be further understood from the technical features disclosed in the invention.

In order to achieve one or a part or all of the above objectives or other objectives, an embodiment of the invention provides a projector, which includes an illumination system, a light valve and a projection lens. The illumination system is adapted to provide an illumination beam. The illumination system includes a plurality of light source modules and a light combining assembly. The light source modules are adapted to provide a plurality of first color beams, a plurality of second color beams and a plurality of third color beams. The light source modules include a first light source module and at least one second light source module. The first light source module is adapted to provide the first color beams. The first light source module includes a first integrating element, a second integrating element, a plurality of first light emitting elements, a plurality of second light emitting elements, and a plurality of third light emitting element. The first integrating element has a plurality of first light reflecting regions and a plurality of first light transmitting regions located in a first plane. The first light transmitting regions are alternately arranged between the first light reflecting regions. The second integrating element has a plurality of second light reflecting regions and a plurality of second light transmitting regions located in a second plane. The second plane and the first plane are not parallel to each other. The second light transmitting regions are alternately arranged between the second light reflecting regions. The first light emitting elements are adapted to respectively provide a plurality of first sub-beams. The first light reflecting regions are located on a transmission path of the first sub-beams. The second light emitting elements are adapted to respectively provide a plurality of second sub-beams. The second light reflecting regions are located on a transmission path of the second sub-beams. The third light emitting elements are adapted to respectively provide a plurality of third sub-beams. The first light transmitting regions and the second light transmitting regions are located on a transmission path of the third sub-beams. The first sub-beams, the second sub-beams and the third sub-beams have the same color. The first color beams include the first sub-beams, the second sub-beams and the third sub-beams. The at least one second light source module is adapted to provide the second color beams and the third color beams. A color of first color beams is different from a color of the second color beams, the color of the first color beams is different from a color of the third color beams, and the color of the second color beams is different from the color of the third color beams. The light combining assembly is located between the light source modules. The first color beams, the second color beams and the third color beams are guided by the light combining assembly to travel in an illumination direction, so that the first color beams, the second color beams and the third color beams are merged into the illumination beam. The light valve is located on a transmission path of the illumination beam and is adapted to convert the illumination beam into an image beam. The projection lens is located on a transmission path of the image beam.

In order to achieve one or a part or all of the above objectives or other objectives, an embodiment of the invention provides an illumination system, which includes a plurality of light source modules and a light combining assembly. The light source modules are adapted to provide a plurality of first color beams, a plurality of second color beams and a plurality of third color beams. The light source modules include a first light source module and at least one second light source module. The first light source module is adapted to provide the first color beams. The first light source module includes a first integrating element, a second integrating element, a plurality of first light emitting elements, a plurality of second light emitting elements, and a plurality of third light emitting element. The first integrating element has a plurality of first light reflecting regions and a plurality of first light transmitting regions located in a first plane. The first light transmitting regions are alternately arranged between the first light reflecting regions. The second integrating element has a plurality of second light reflecting regions and a plurality of second light transmitting regions located in a second plane. The second plane and the first plane are not parallel to each other. The second light transmitting regions are alternately arranged between the second light reflecting regions. The first light emitting elements are adapted to respectively provide a plurality of first sub-beams. The first light reflecting regions are located on a transmission path of the first sub-beams. The second light emitting elements are adapted to respectively provide a plurality of second sub-beams. The second light reflecting regions are located on a transmission path of the second sub-beams. The third light emitting elements are adapted to respectively provide a plurality of third sub-beams. The first light transmitting regions and the second light transmitting regions are located on a transmission path of the third sub-beams. The first sub-beams, the second sub-beams and the third sub-beams have the same color. The first color beams include the first sub-beams, the second sub-beams and the third sub-beams. The at least one second light source module is adapted to provide the second color beams and the third color beams. A color of first color beams is different from a color of the second color beams, the color of the first color beams is different from a color of the third color beams, and the color of the second color beams is different from the color of the third color beams. The light combining assembly is located between the light source modules. The first color beams, the second color beams and the third color beams are guided by the light combining assembly to travel in an illumination direction, so that the first color beams, the second color beams and the third color beams are merged into the illumination beam. The light valve is located on a transmission path of the illumination beam and is adapted to convert the illumination beam into an image beam. The projection lens is located on a transmission path of the image beam.

In summary, the illumination system in the projector of the embodiment of the invention includes a first light source module, at least one second light source module, and a light combining assembly. At least one light source module (first light source module or second light source module) includes two integrating elements and three sets of light emitting elements. Each integrating element has a plurality of light reflecting regions and a plurality of light transmitting regions. The sub-beams respectively emitted by the three sets of light emitting elements are combined into a single color beam by a design in which the two integrating elements are not parallel to each other. In addition, an adjustment mechanism may be disposed in each of the light source modules and the light combining assembly to solve the problem that the manufacturing tolerance is difficult to control. The embodiment of the invention can achieve the effect of the densest light accumulation, thereby effectively reducing the volume of the illumination system and the space cost. The embodiment of the invention can make the illumination system have good optical quality, and thus the projection system has good imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
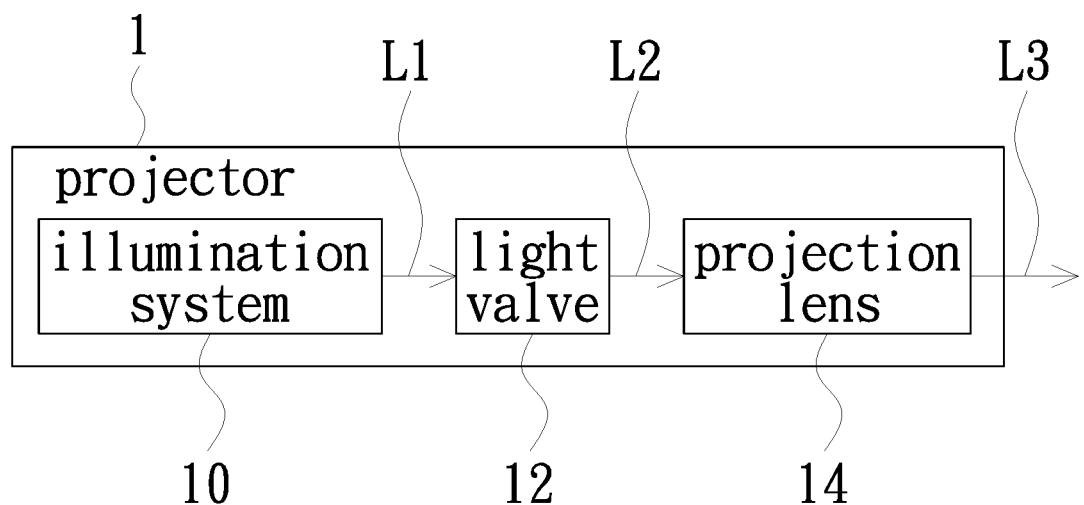
FIG. 1 is a functional block diagram of a projector according to an embodiment of the invention.

FIG. 1 is a functional block diagram of a projector according to an embodiment of the invention. As shown in FIG. 1, the projector 1 of the embodiment includes an illumination system 10, a light valve 12 and a projection lens 14. In the embodiment, the illumination system 10 is adapted to provide an illumination beam L1. The light valve 12 is located on the transmission path of the illumination beam L1, and the light valve 12 is adapted to convert the illumination beam L1 into an image beam L2. In the embodiment, the light valve 12 may be a digital micromirror device (DMD), a liquid crystal on silicon (LCoS) or a liquid crystal display (LCD) panel, but the invention is not limited thereto. The projection lens 14 is located on the transmission path of the image beam L2, and the image beam L2 passes through the projection lens 14 to become a projection beam L3. The projector 1 of the embodiment can adopt the structure of a single-piece light valve or a multi-piece (e.g., three-piece or two-piece) light valve, and the invention does not limit the number of light valves.

The detailed configuration of the illumination system 10 of the embodiment is further described below.

Figure 2:
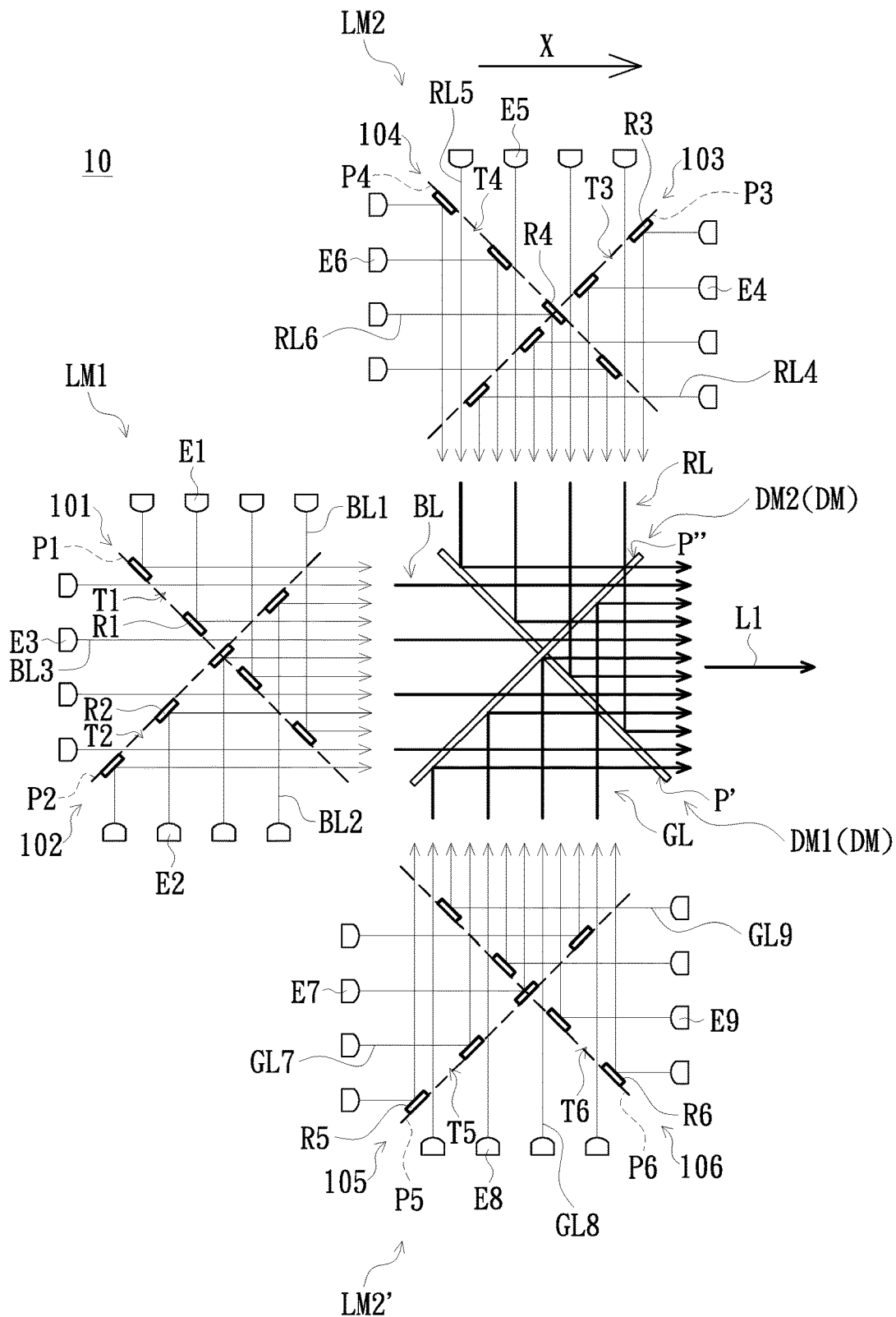
FIG. 2 is a schematic structural view of the illumination system shown in FIG. 1.

FIG. 2 is a schematic structural view of the illumination system shown in FIG. 1. As shown in FIGS. 1 and 2, the illumination system 10 of the embodiment includes a plurality of light source modules and a light combining assembly DM. In the embodiment, to facilitate a better explanation, the light source modules include, for example, a first light source module LM1 and two second light source modules LM2 and LM2', but the invention is not limited thereto. These light source modules are adapted to provide a plurality of color beams BL, a plurality of color beams RL and a plurality of color beams GL, wherein the color beams BL, the color beams RL and the color beams GL are different in color from each other. More specifically, the color of the color beam BL is different from the color of the color beam RL, the color of the color beam BL is different from the color of the color beam GL, and the color of the color beam RL is different from the color of the color beam GL. In the embodiment, the color of the color beam BL is blue for example, the color of the color beam RL is red for example, and the color of the color beam GL is green for example, but the invention is not limited thereto. The light combining assembly DM is located between these light source modules, that is, located between the first light source module LM1 and the two second light source modules LM2 and LM2' for example. In the embodiment, the color beams BL, the color beams RL and the color beams GL are guided by the light combining assembly DM to travel along the illumination direction X, so that the color beams BL, the color beams RL and the color beams GL are merged into the illumination beam L1.

As shown in FIG. 2, in the embodiment, the first light source module LM1 provides these color beams BL. The first light source module LM1 includes an integrating element 101, an integrating element 102, a plurality of light emitting elements E1, a plurality of light emitting elements E2, and a plurality of light emitting elements E3. The integrating element 101 has a plurality of light reflecting regions R1 and a plurality of light transmitting regions T1 on the plane P1, and the light transmitting regions T1 are alternately arranged between the light reflecting regions R1. The integrating element 102 has a plurality of light reflecting regions R2 and a plurality of light transmitting regions T2 on the plane P2, and the light transmitting regions T2 are alternately arranged between the light reflecting regions R2. In the embodiment, the plane P2 which the integrating element 102 is located on and the plane P1 which the integrating element 101 is located on are not parallel to each other. In the embodiment, the integrating element 101 is, for example, perpendicular to the integrating element 102, that is, the plane P1 and the plane P2 are, for example, perpendicular to each other, but the invention is not limited thereto.

As shown in FIG. 2, these light emitting elements E1 respectively provide a plurality of sub-beams BL1, wherein these light reflecting regions R1 of the integrating element 101 are respectively located on the transmission paths of these sub-beams BL1. These light emitting elements E2 respectively provide a plurality of sub-beams BL2, wherein these light reflecting regions R2 of the integrating element 102 are respectively located on the transmission paths of these sub-beams BL2. These light emitting elements E3 respectively provide a plurality of sub-beams BL3, wherein these light transmitting regions T1 of the integrating element 101 and these light transmitting regions T2 of the integrating element 102 are respectively located on the transmission paths of these sub-beams BL3. In the embodiment, these color beams BL are blue beams for example, and these color beams BL include these sub-beams BL1, these sub-beams BL2 and these sub-beams BL3, that is, these sub-beams BL1, these sub-beams BL2 and these sub-beams BL3 have the same color.

As shown in FIG. 2, in detail, in the embodiment, part of the sub-beams BL1 are reflected by the light reflecting regions R1 of the integrating element 101, and then travel in the illumination direction X, and then pass through the light transmitting regions T2 of the integrating element 102; and part of the sub-beams BL1 pass through the light transmitting regions T2 of the integrating element 102, and then reflected by the light reflecting regions R1 of the integrating element 101, and then travel in the illumination direction X. In the embodiment, part of the sub-beams BL2 are reflected by the light reflecting regions R2 of the integrating element 102, and then travel in the illumination direction X, and then pass through the light transmitting regions T1 of the integrating element 101; and part of the sub-beams BL2 pass through the light transmitting regions T1 of the integrating element 101, and then reflected by the light reflecting regions R2 of the integrating element 102, and then travel in the illumination direction X. In the embodiment, the sub-beams BL3 emitted from the light emitting elements E3 pass through the light transmitting regions T1 and the light transmitting regions T2 and then travel in the illumination direction X. From another point of view, in the embodiment, these light emitting elements E1 respectively correspond to these light reflecting regions R1 of the integrating element 101 for example, and respectively correspond to these light transmitting regions T2 of the integrating element 102 for example; these light emitting elements E2 respectively correspond to the light reflecting regions R2 of the integrating element 102 for example, and respectively correspond to the light transmitting regions T1 of the integrating element 101 for example; and the light emitting elements E3 respectively correspond to the light transmitting regions T1 of the integrating element 101 and the light transmitting regions T2 of the integrating element 102 for example.

As shown in FIG. 2, in the embodiment, the second light source module LM2 provides these color beams RL. The second light source module LM2 includes an integrating element 103, an integrating element 104, a plurality of light emitting elements E4, a plurality of light emitting elements E5, and a plurality of light emitting elements E6. The integrating element 103 has a plurality of light reflecting regions R3 and a plurality of light transmitting regions T3 on the plane P3, and the light transmitting regions T3 are alternately arranged between the light reflecting regions R3. The integrating element 104 has a plurality of light reflecting regions R4 and a plurality of light transmitting regions T4 on the plane P4, and the light transmitting regions T4 are alternately arranged between the light reflecting regions R4. In the embodiment, the plane P3 which the integrating element 103 is located on and the plane P4 which the integrating element 104 is located on are not parallel to each other. In the embodiment, the integrating element 103 is, for example, perpendicular to the integrating element 104, that is, the plane P3 and the plane P4 are, for example, perpendicular to each other, but the invention is not limited thereto.

As shown in FIG. 2, these light emitting elements E4 respectively provide a plurality of sub-beams RL4, wherein these light reflecting regions R3 of the integrating element 103 are respectively located on the transmission paths of these sub-beams RL4. These light emitting elements E5 respectively provide a plurality of sub-beams RL5, wherein these light transmitting regions T3 of the integrating element 103 and these light transmitting regions T4 of the integrating element 104 are respectively located on the transmission paths of these sub-beams RL5. These light emitting elements E6 respectively provide a plurality of sub-beams RL6, wherein these light reflecting regions R4 of the integrating element 104 are respectively located on the transmission paths of these sub-beams RL6. In short, in the embodiment, the integrating element 103 and the integrating element 104 are located on the transmission paths of the sub-beams RL4/the sub-beams RL5/the sub-beams RL6. In the embodiment, these color beams RL are red beams for example, and these color beams RL include these sub-beams RL4, these sub-beams RL5 and these sub-beams RL6, that is, these sub-beams RL4, these sub-beams RL5 and these sub-beams RL6 have the same color.

As shown in FIG. 2, in detail, in the embodiment, part of the sub-beams RL4 are reflected by the light reflecting regions R3 of the integrating element 103, and then pass through the light transmitting regions T4 of the integrating element 104; and part of the sub-beams RL4 pass through the light transmitting regions T4 of the integrating element 104, and then reflected by the light reflecting regions R3 of the integrating element 103. In the embodiment, part of the sub-beams RL6 are reflected by the light reflecting regions R4 of the integrating element 104, and then pass through the light transmitting regions T3 of the integrating element 103; and part of the sub-beams RL6 pass through the light transmitting regions T3 of the integrating element 103, and then reflected by the light reflecting regions R4 of the integrating element 104. In the embodiment, the sub-beams RL5 emitted from the light emitting elements E5 pass through the light transmitting regions T3 and the light transmitting regions T4. From another point of view, in the embodiment, these light emitting elements E4 respectively correspond to these light reflecting regions R3 of the integrating element 103 for example, and respectively correspond to these light transmitting regions T4 of the integrating element 104 for example; these light emitting elements E6 respectively correspond to the light reflecting regions R4 of the integrating element 104 for example, and respectively correspond to the light transmitting regions T3 of the integrating element 103 for example; and the light emitting elements E5 respectively correspond to the light transmitting regions T3 of the integrating element 103 and the light transmitting regions T4 of the integrating element 104 for example.

As shown in FIG. 2, in the embodiment, another second light source module LM2' provides these color beams GL. The second light source module LM2' includes an integrating element 105, an integrating element 106, a plurality of light emitting elements E7, a plurality of light emitting elements E8, and a plurality of light emitting elements E9. The integrating element 105 has a plurality of light reflecting regions R5 and a plurality of light transmitting regions T5 on the plane P5, and the light transmitting regions T5 are alternately arranged between the light reflecting regions R5. The integrating element 106 has a plurality of light reflecting regions R6 and a plurality of light transmitting regions T6 on the plane P6, and the light transmitting regions T6 are alternately arranged between the light reflecting regions R6. In the embodiment, the plane P5 which the integrating element 105 is located on and the plane P6 which the integrating element 106 is located on are not parallel to each other. In the embodiment, the integrating element 105 is, for example, perpendicular to the integrating element 106, that is, the plane P5 and the plane P6 are, for example, perpendicular to each other, but the invention is not limited thereto.

As shown in FIG. 2, these light emitting elements E7 respectively provide a plurality of sub-beams GL7, wherein these light reflecting regions R5 of the integrating element 105 are respectively located on the transmission paths of these sub-beams GL7. These light emitting elements E8 respectively provide a plurality of sub-beams GL8, wherein these light transmitting regions T5 of the integrating element 105 and these light transmitting regions T6 of the integrating element 106 are respectively located on the transmission paths of these sub-beams GL8. These light emitting elements E9 respectively provide a plurality of sub-beams GL9, wherein these light reflecting regions R6 of the integrating element 106 are respectively located on the transmission paths of these sub-beams GL9. In short, in the embodiment, the integrating element 105 and the integrating element 106 are located on the transmission paths of the sub-beams GL7/the sub-beams GL8/the sub-beams GL9. In the embodiment, these color beams GL are green beams for example, and these color beams GL include these sub-beams GL7, these sub-beams GL8 and these sub-beams GL9, that is, these sub-beams GL7, these sub-beams GL8 and these sub-beams GL9 have the same color.

As shown in FIG. 2, in detail, in the embodiment, part of the sub-beams GL7 are reflected by the light reflecting regions R5 of the integrating element 105, and then pass through the light transmitting regions T6 of the integrating element 106; and part of the sub-beams GL7 pass through the light transmitting regions T6 of the integrating element 106, and then reflected by the light reflecting regions R5 of the integrating element 105. In the embodiment, part of the sub-beams GL9 are reflected by the light reflecting regions R6 of the integrating element 106, and then pass through the light transmitting regions T5 of the integrating element 105; and part of the sub-beams GL9 pass through the light transmitting regions T5 of the integrating element 105, and then reflected by the light reflecting regions R6 of the integrating element 106. In the embodiment, the sub-beams GL8 pass through the light transmitting regions T5 and the light transmitting regions T6. From another point of view, in the embodiment, these light emitting elements E7 respectively correspond to these light reflecting regions R5 of the integrating element 105 for example, and respectively correspond to these light transmitting regions T6 of the integrating element 106 for example; these light emitting elements E9 respectively correspond to the light reflecting regions R6 of the integrating element 106 for example, and respectively correspond to the light transmitting regions T5 of the integrating element 105 for example; and the light emitting elements E8 respectively correspond to the light transmitting regions T5 of the integrating element 105 and the light transmitting regions T6 of the integrating element 106 for example.

As shown in FIG. 2, the light combining assembly DM of the embodiment includes a light combining element DM1 and a light combining element DM2. In the embodiment, the light combining element DM1/light combining element DM2 is located between the first light source module LM1 and the two second light source modules LM2 and LM2'. The light combining element DM1 is located on the plane V. The light combining element DM2 is located on the plane P'''. In the embodiment, the plane P' and the plane P''' are not parallel to each other. In the embodiment, the light combining element DM1 is, for example, perpendicular to the light combining element DM2, that is, the plane P' and the plane P''' are perpendicular to each other for example, but the invention is not limited thereto. In the embodiment, the light combining element DM1/light combining element DM2 is, for example, a dichroic mirror, but the invention is not limited thereto. In other embodiments, the light combining element DM1/light combining element DM2 may be a prism having a dichroic coating, but the invention is not limited thereto. In short, the light combining element DM1 and the light combining element DM2 are both dichroic elements. In an embodiment, the projector 1 may further include a diffuser device (not shown) disposed therein. The diffuser device may be a diffuser wheel or a diffuser sheet. In an embodiment, the diffuser wheel may be located on the transmission path of the illumination beam L1 and is located between the illumination system 10 and the light valve 12. In an embodiment, the projector 1 may further include a light homogenizing element (not shown) disposed therein, and the light homogenizing element may be an integration rod or a fly eye device. In an embodiment, the integration rod may be located on the transmission path of the illumination beam L1 from the diffuser wheel and is located between the diffuser wheel and the light valve 12. In an embodiment, the projector 1 may further include a condenser (not shown) disposed therein, and the condenser may be located on the transmission path of the illumination beam L1 and is located between the illumination system 10 and the diffuser wheel.

Figure 3A:
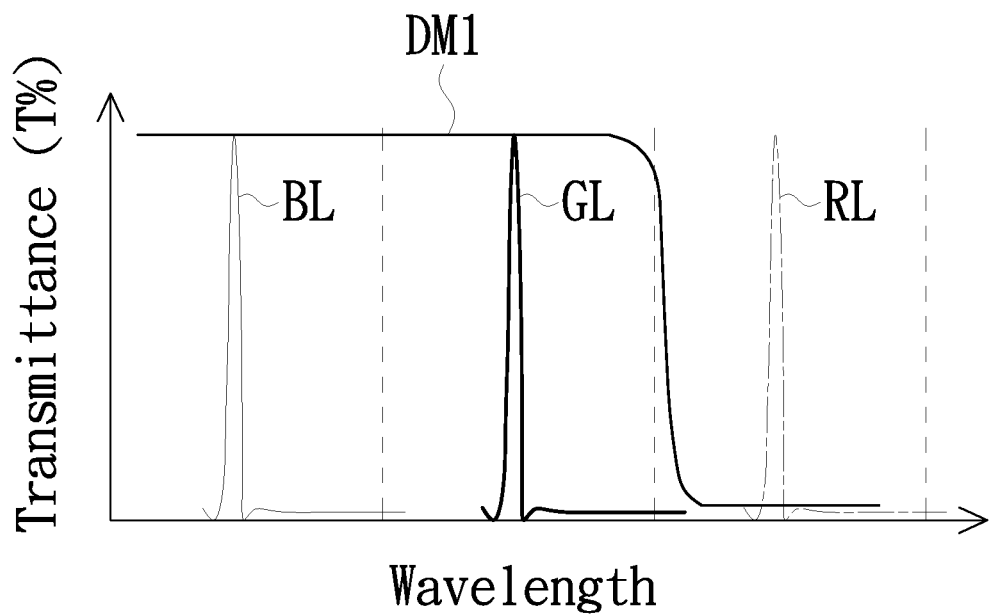
FIG. 3A is a schematic diagram of a light transmission spectrum of the light combining element shown in FIG. 1.
Figure 3B:
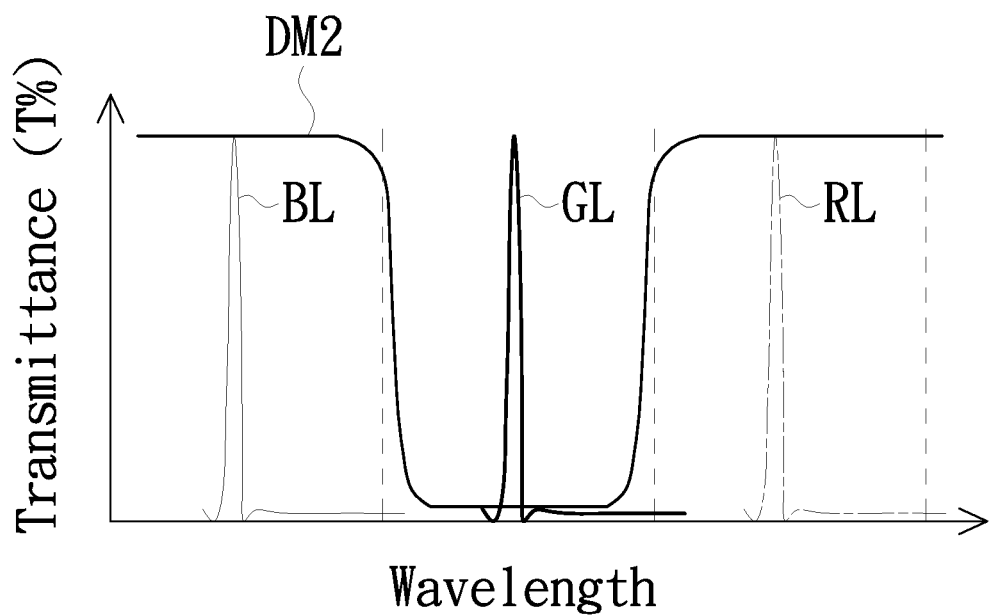
FIG. 3B is a schematic diagram of a light transmission spectrum of the light combining element shown in FIG. 2.

FIG. 3A is a schematic diagram of a light transmission spectrum of the light combining element DM1 shown in FIG. 1. FIG. 3B is a schematic diagram of a light transmission spectrum of the light combining element DM2 shown in FIG. 2. As shown in FIGS. 2 to 3B, in the embodiment, the light combining element DM1 reflects these color beams RL which are provided by the second light source module LM2 and travel in the illumination direction X, and the light combining element DM2 reflects these color beams GL which are provided by another second light source modules LM2' and travel in the illumination direction X, and these color beams BL provided by the first light source module LM1 and traveling in the illumination direction X pass through the light combining element DM1 and the light combining element DM2. In the embodiment, as shown in FIG. 3A, the transmittance of the light combining element DM1 for the color beam RL (e.g., red beam) approaches 0% for example, and for the color beam BL (e.g., blue beam) and the color beam GL (e.g., green beam) approaches 100% for example. That is, in the embodiment, the light combining element DM1 reflects the red beam and allows the blue beam and the green beam to pass therethrough. In the embodiment, as shown in FIG. 3B, the transmittance of the light combining element DM2 for the color beam GL (e.g., green beam) approaches 0% for example, and for the color beam BL (e.g., blue beam) and the color beam RL (e.g., red beam) approaches 100% for example. That is, in the embodiment, the light combining element DM2 reflects the green beam and allows the blue beam and the red beam to pass therethrough. In detail, part of the color beams RL are reflected by the light combining element DM1 and then pass through the light combining element DM2; and part of the color beams RL pass through the light combining element DM2 and are then reflected by the light combining element DM1. Part of the color beams GL are reflected by the light combining element DM2 and then pass through the light combining element DM1; and part of the color beams GL pass through the light combining element DM1 and are then reflected by the light combining element DM2. In short, in the embodiment, the color beams RL and the color beams GL can also pass through at least part of the light combining element DM1 and at least part of the light combining element DM2 in the illumination direction X.

Figure 4:
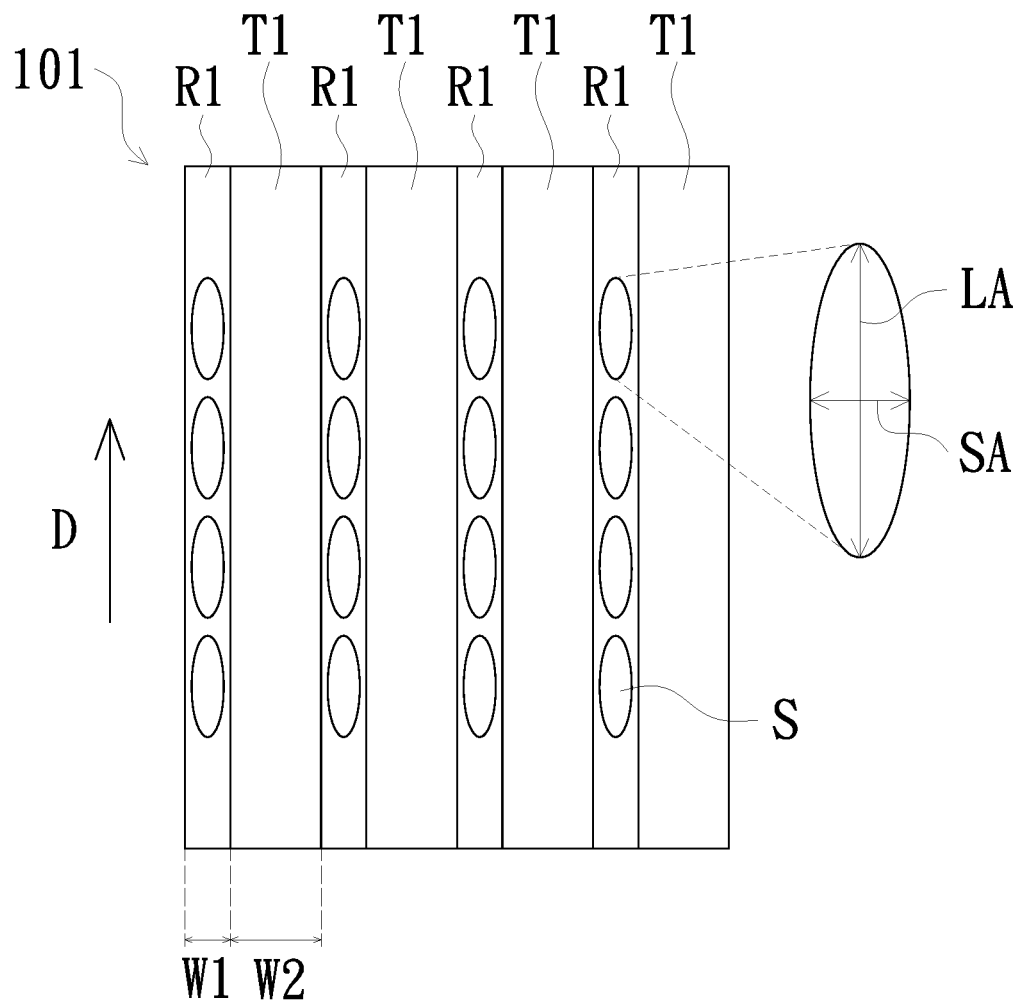
FIG. 4 is a schematic view of the sub-beams shown in FIG. 2 forming a plurality of light spots on the integrating element.

In the embodiment, the light emitting element E1/light emitting element E2/light emitting element E3/light emitting element E4/light emitting element E5/light emitting element E6/light emitting element E7/light emitting element E8/light emitting element E9 is, for example, a laser diode, but is not limited thereto, and may be a light emitting diode chip for example. As shown in FIGS. 2 and 4, taking these sub-beams BL1 provided by these light emitting elements E1 forming a plurality of light spots S on these light reflecting regions R1 of the integrating element 101 as an example, a shape of each light spot S has a long axis LA and a short axis SA, and the extending direction of these long axes LA and the extending direction D of the light reflecting region R1 are identical to each other. In the embodiment, the extending direction D of the light reflecting region R1 is, for example, perpendicular to the illumination direction X, but the invention is not limited thereto. Similarly, the light spots formed by the sub-beams BL2 provided by these light emitting elements E2 on these light reflecting regions R2 of the integrating element 102 also have the above-described features; the light spots formed by the sub-beams RL4 provided by these light emitting elements E4 on these light reflecting regions R3 of the integrating element 103 also have the above-described features; the light spots formed by the sub-beams RL6 provided by these light emitting elements E6 on these light reflecting regions R4 of the integrating element 104 also have the above-described features; the light spots formed by the sub-beams GL7 provided by these light emitting elements E7 on these light reflecting regions R5 of the integrating element 105 also have the above-described features; and the light spots formed by the sub-beams GL9 provided by these light emitting elements E9 on these light reflecting regions R6 of the integrating element 106 also have the above-described features.

As shown in FIG. 4, taking the integrating element 101 as an example, each light reflecting region R1 has a width W1, and the light transmitting region T1 has a width W2 in a direction perpendicular to the extending direction D of the light reflecting region R1. In the embodiment, the width W2 of each light transmitting region T1 is greater than the width W1 of each light reflecting region R1. In the embodiment, the integrating element 101 and the integrating element 102 form, for example, a crossed stripe mirror. In detail, the integrating element 101 and the integrating element 102 of the embodiment are, for example, perpendicular to each other (i.e., the angle at which they cross each other is 90 degrees), and the ratio of the width W2 of each light transmitting region T1 to the width W1 of each light reflecting region R1 of the integrating element 101 is, for example, 2:1. These light reflecting regions R1 are located on the transmission paths of the sub-beams BL1 provided by the light emitting elements E1 respectively, and part of the light transmitting regions T1 are located on the transmission paths of part of the sub-beam BL3 provided by part of the light emitting elements E3 respectively. Similarly, the light transmitting regions T2 and the light reflecting regions R2 of the integrating element 102 also have the above-described features, these light reflecting regions R2 are located on the transmission paths of the sub-beams BL2 provided by the light emitting elements E2 respectively, and part of the light transmitting regions T2 are located on the transmission paths of part of the sub-beam BL3 provided by part of the light emitting elements E3 respectively. Similarly, in the case where the integrating element 103 and the integrating element 104 cross each other and are perpendicular to each other, the light transmitting regions T3 and the light reflecting regions R3 of the integrating element 103 also have the above-described features, and the light transmitting regions T4 and the light reflecting regions R4 of the integrating element 104 also have the above-described features. Similarly, in the case where the integrating element 105 and the integrating element 106 cross each other and are perpendicular to each other, the light transmitting regions T5 and the light reflecting regions R5 of the integrating element 105 also have the above-described features, and the light transmitting regions T6 and the light reflecting regions R6 of the integrating element 106 are also Has the above-described features.

Figure 5A:
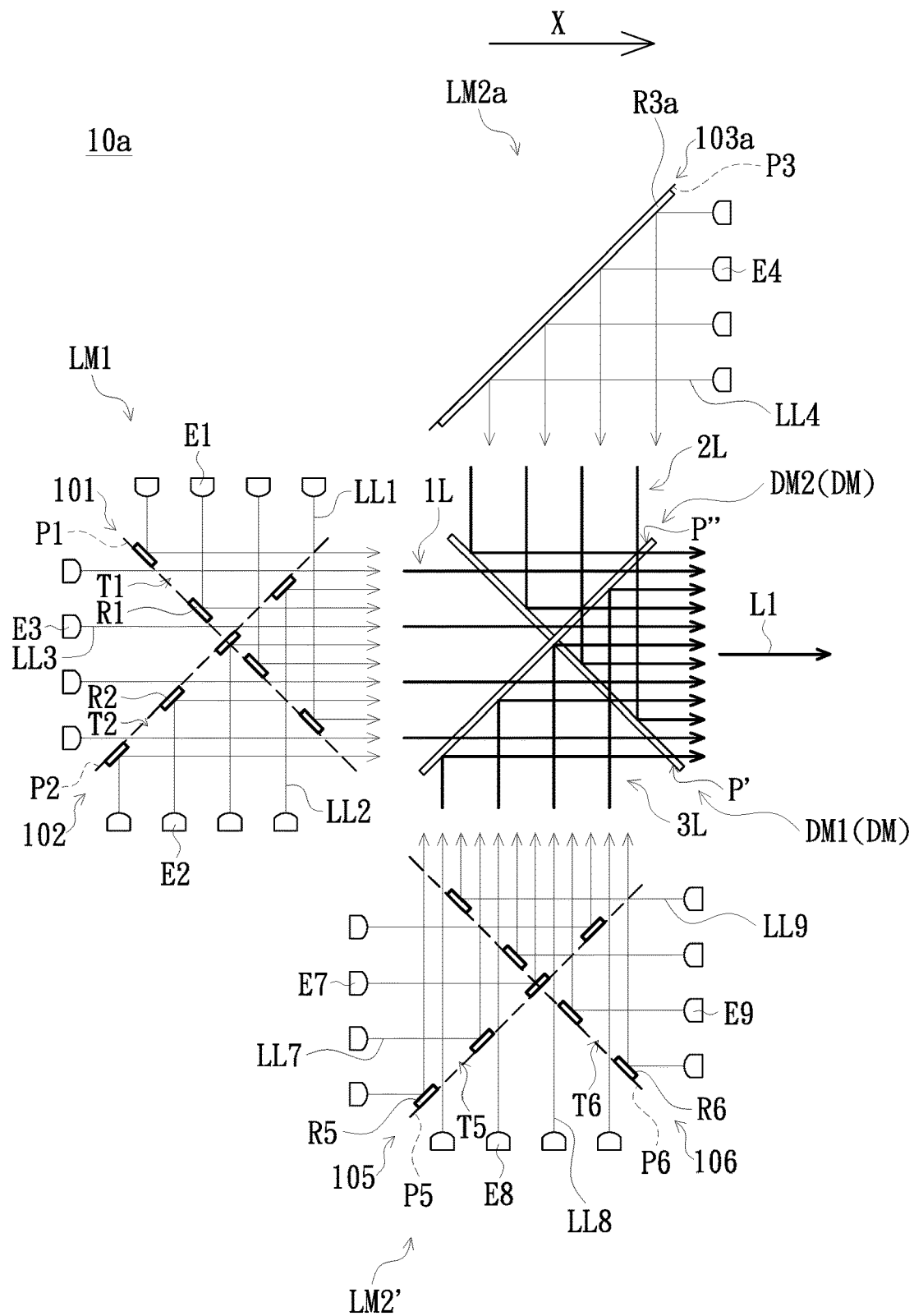
FIGS. 5A-5D are schematic structural views of an illumination system according to four embodiments of the invention.

FIG. 5A is a schematic structural view of an illumination system according to another embodiment of the invention. The color beam 1L in FIG. 5A is composed, for example, of sub-beams LL1, sub-beams LL2 and sub-beams LL3 of the same color. The color beam 3L in FIG. 5A is composed, for example, of sub-beams LL7, sub-beams LL8 and sub-beams LL9 of the same color. The color of the color beam 1L in FIG. 5A is different from the color of the color beam 2L, the color of the color beam 1L in FIG. 5A is different from the color of the color beam 3L, and the color of the color beam 2L in FIG. 5A is different from the color of the color beam 3L. As shown in FIG. 5A, the illumination system 10a of the embodiment is similar to the illumination system 10 shown in FIG. 2. The main difference is that the second light source module LM2a of the illumination system 10a of the embodiment includes only an integrating element 103a and a plurality of light emitting elements E4, wherein the integrating element 103a is a reflective element R3a. These light emitting elements E4 provide a plurality of sub-beams LL4, and the integrating element 103a (reflective element R3a) is located on the transmission paths of these sub-beams LL4. In the embodiment, these color beams 2L include only these sub-beams LL4.

Figure 5B:
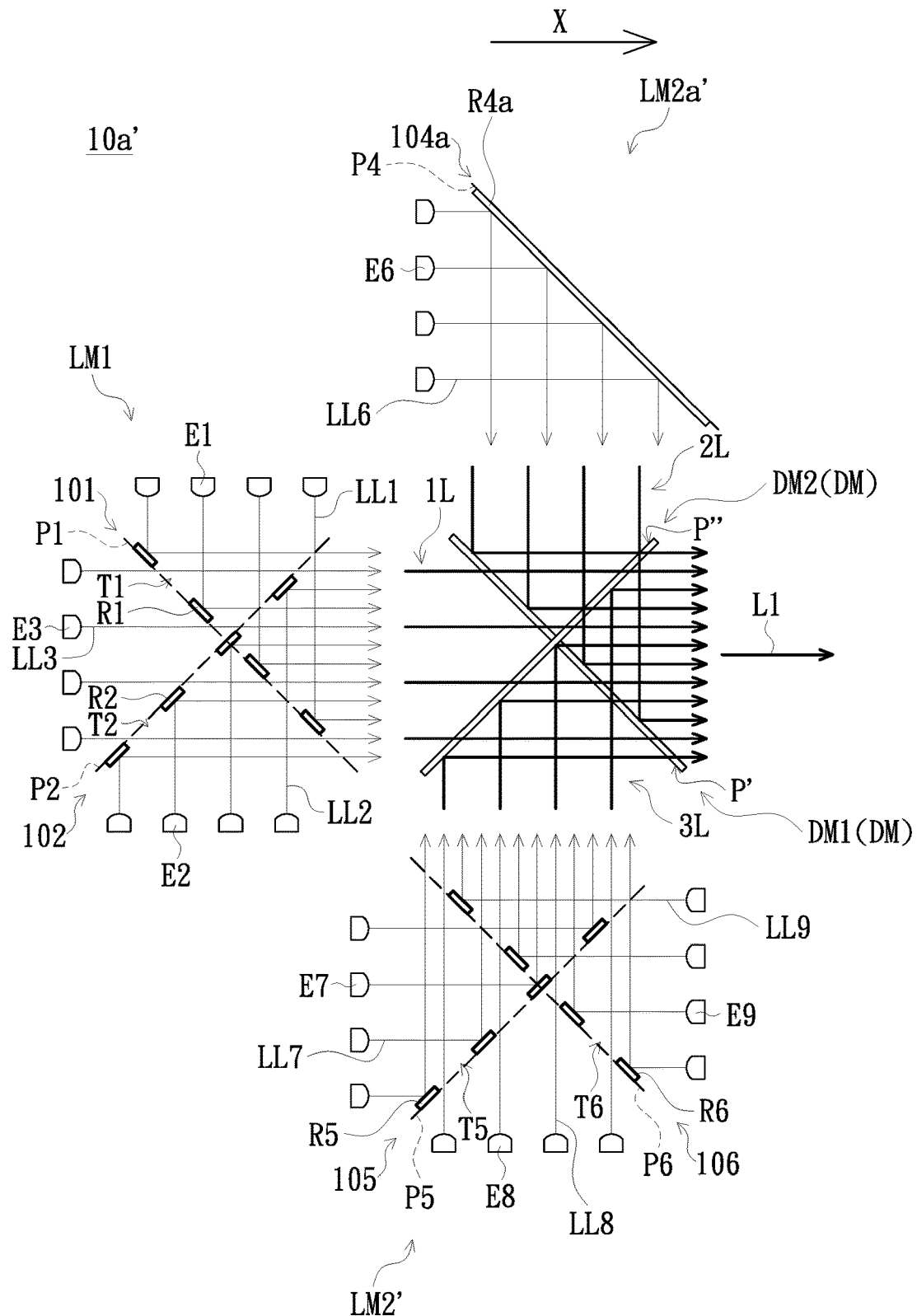

FIG. 5B is a schematic structural view of an illumination system according to another embodiment of the invention. As shown in FIG. 5B, the illumination system 10a' of the embodiment is similar to the illumination system 10a shown in FIG. 5A. The main difference is that the second light source module LM2a' of the embodiment is composed of an integrating element 104a and a plurality of light emitting elements E6, wherein the integrating element 104a is the reflective element R4a. These light emitting elements E6 provide a plurality of sub-beams LL6, and the integrating element 104a (reflective element R4a) is located on the transmission paths of these sub-beams LL6. In the embodiment, these color beams 2L include only these sub-beams LL6.

Figure 5C:
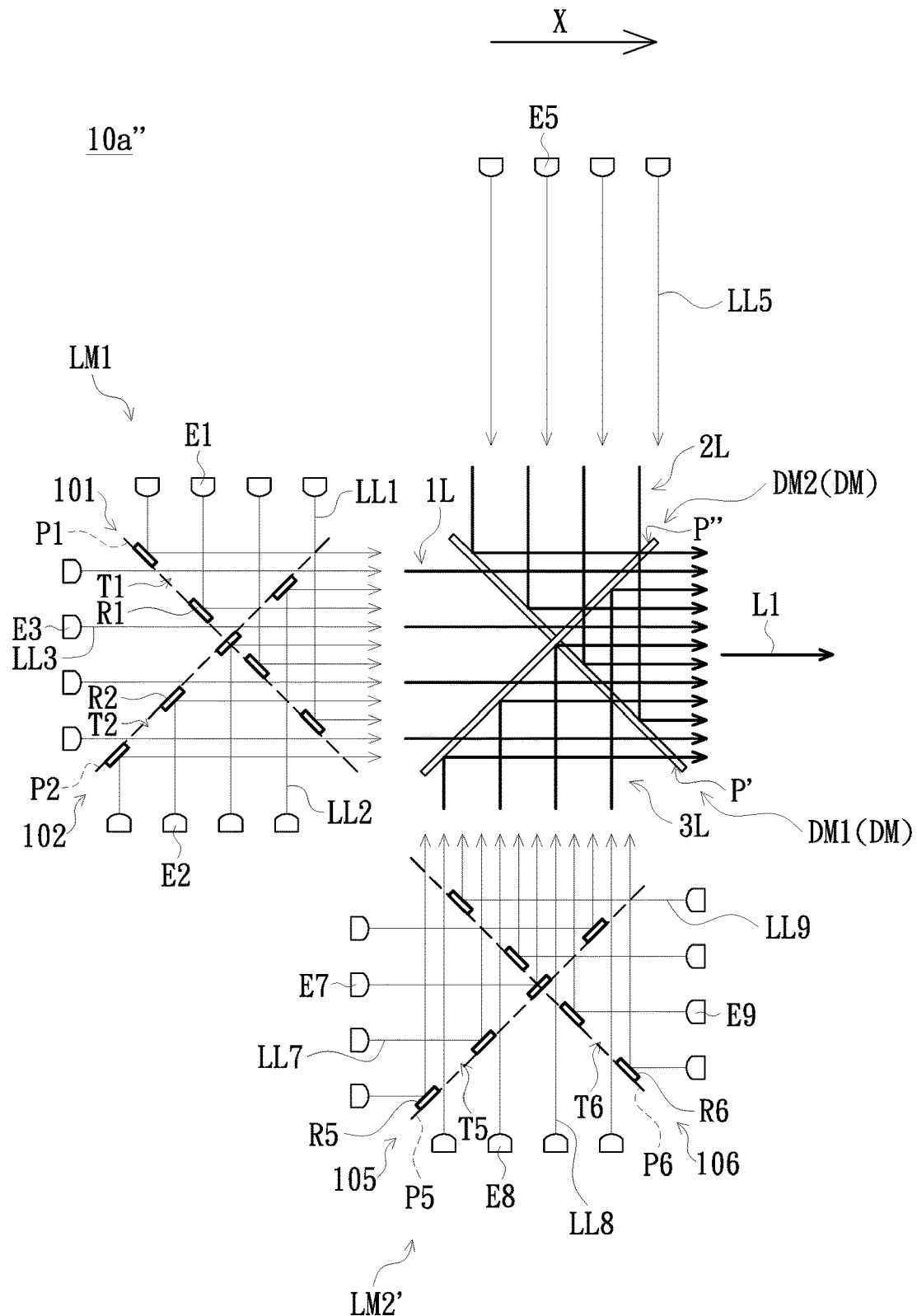

FIG. 5C is a schematic structural view of an illumination system according to another embodiment of the invention. As shown in FIG. 5C, the illumination system 10a" of the embodiment is similar to the illumination system 10a shown in FIG. 5A. The main difference is that the second light source module of the embodiment is composed of a plurality of light emitting elements E5. These light emitting elements E5 provide a plurality of sub-beams LL5, and these color beams 2L include only these sub-beams LL5. However, in an unillustrated embodiment, the light emitting elements E5 and the light combining element DM1 in FIG. 5C may be further omitted. That is, the illumination system has only one second light source module LM2' and thus the illumination system is only composed of the first light source module LM1, the second light source module LM2' and the light combining element DM2, wherein the integrating element 105 and the integrating element 106 are located on the transmission paths of the sub-beams LL7, the sub-beams LL8 and the sub-beams LL9, and three color beams are respectively composed by the sub-beams LL1, the sub-beams LL2, the sub-beams LL3, the sub-beams LL7, the sub-beams LL8 and the sub-beams LL9. The color of the color beam (e.g., composed of the sub-beams LL1, the sub-beams LL2 and the sub-beams LL3) is different from the color of the color beam (e.g., composed of the sub-beams LL7 and the sub-beams LL8); the color of the color beam (e.g., composed of the sub-beams LL1, the sub-beams LL2 and the sub-beams LL3) is different from the color of the color beam (e.g., composed of the sub-beams LL9); and the color of the color beam (e.g., composed of the sub-beams LL7 and the sub-beams LL8) is different from the color of the color beam (e.g., composed of the sub-beams LL9).

Figure 5D:
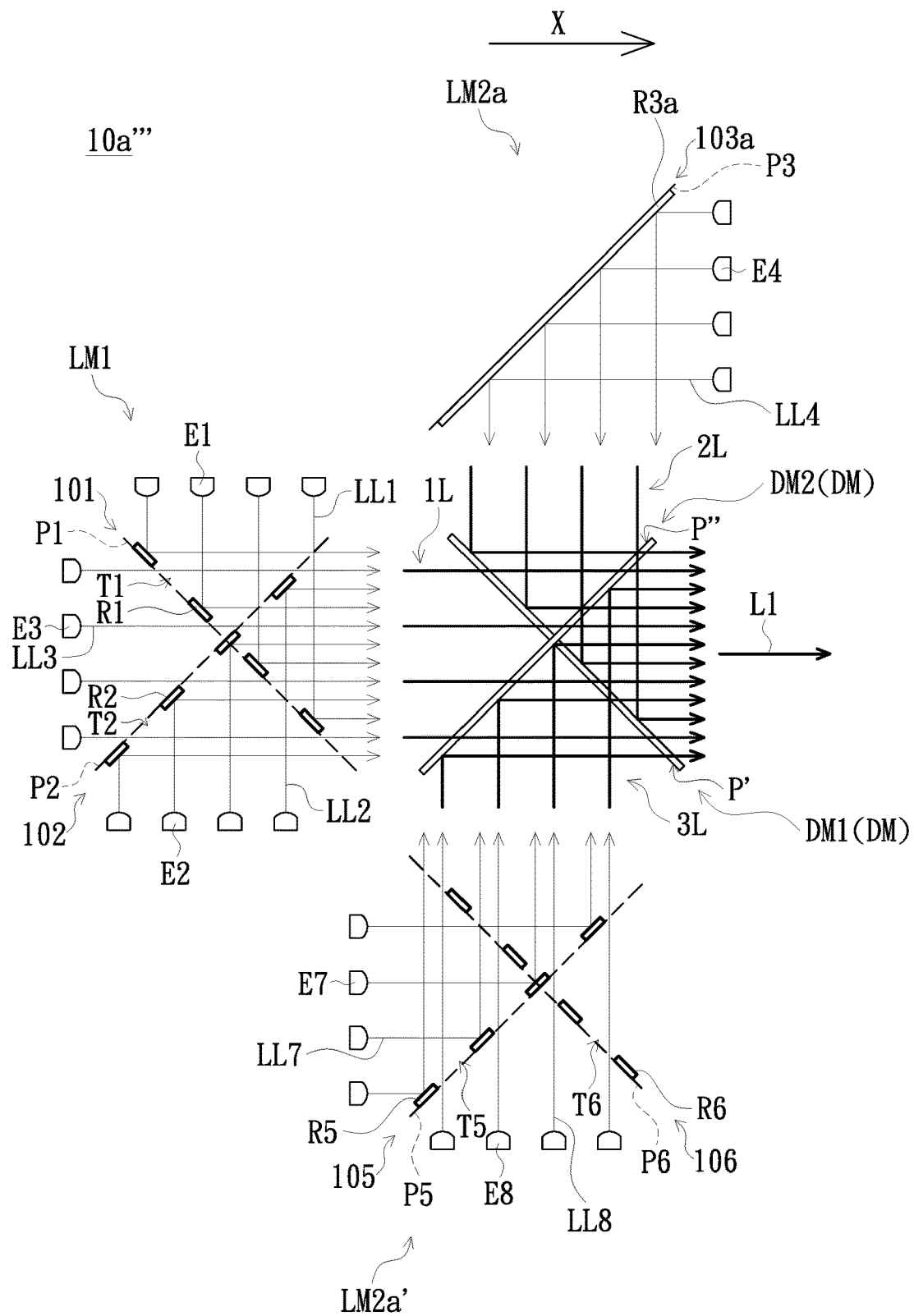

FIG. 5D is a schematic structural view of an illumination system according to another embodiment of the invention. As shown in FIG. 5D, the illumination system 10a''' of the embodiment is similar to the illumination system 10a shown in FIG. 5A. The main difference is that the second light source module LM2a' of the embodiment includes only an integrating element 105, an integrating element 106, a plurality of light emitting elements E7 and a plurality of light emitting elements E8, wherein these color beams 3L include only these sub-beams LL7 and these sub-beams LL8. It can be seen from the above that in some embodiments, the arrangement of the light emitting elements in the first light source module and the second light source module may be different according to actual needs. In addition, in some embodiments, the number of the second light source modules may be one.

Figure 6:
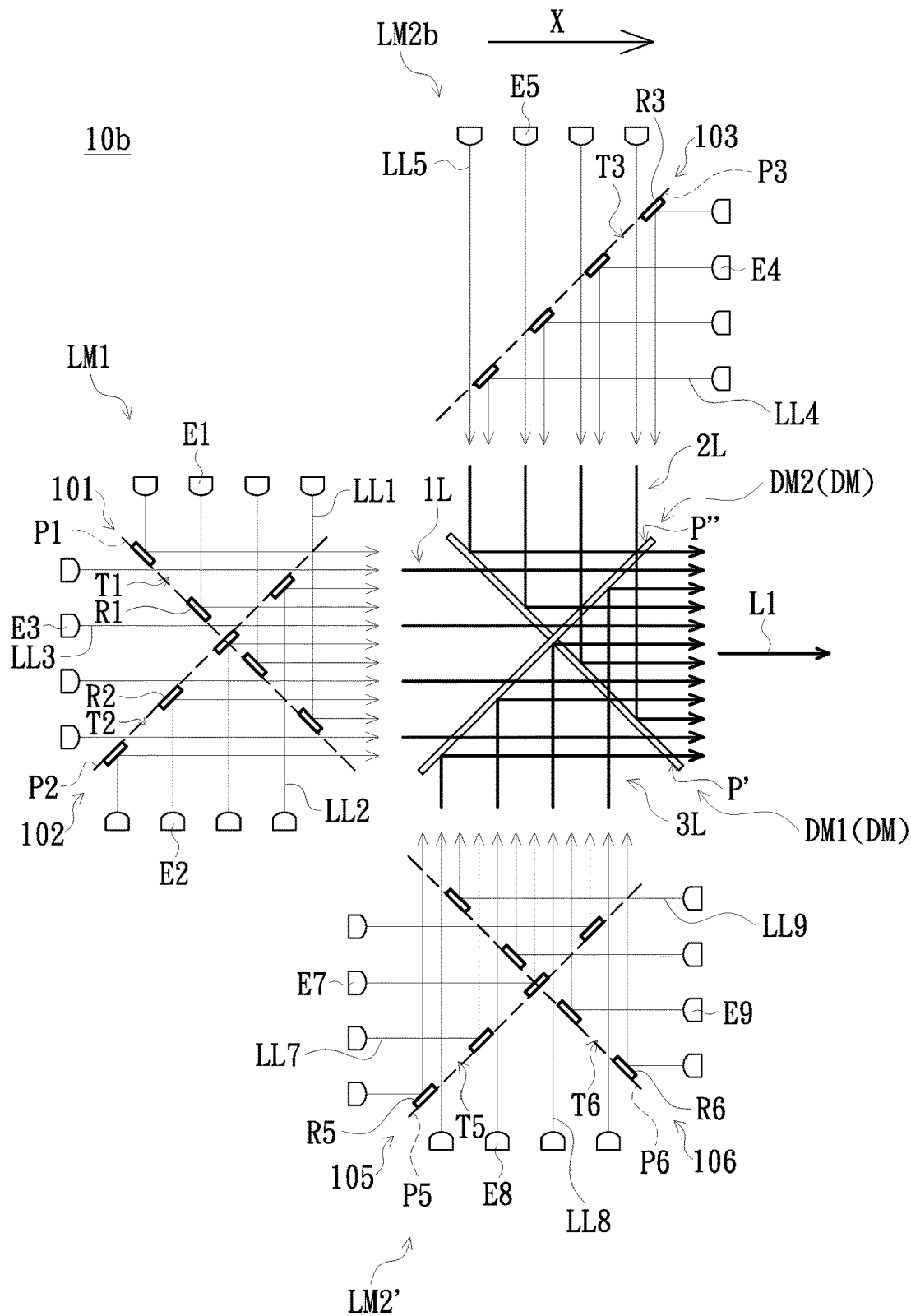
FIGS. 6-9 are schematic structural views of an illumination system according to another four embodiments of the invention.

FIG. 6 is a schematic structural view of an illumination system according to another embodiment of the invention. As shown in FIG. 6, the illumination system 10b of the embodiment is similar to the illumination system 10 shown in FIG. 2. The main difference is that the second light source module LM2b of the illumination system 10b of the embodiment includes only an integrating element 103, a plurality of light emitting elements E4, and a plurality of light emitting elements E5. These light emitting elements E4 provide a plurality of sub-beams LL4, and the light reflecting regions R3 of the integrating element 103 are located on the transmission paths of these sub-beams LL4. These light emitting elements E5 provide a plurality of sub-beams LL5, and the light transmitting regions T3 of the integrating element 103 are located on the transmission paths of these sub-beams LL5. In the embodiment, these color beams 2L include only these sub-beams LL4 and sub-beams LL5. However, in other embodiments, the arrangement of the light emitting elements in the first light source module LM1 and the second light source module LM2' may be different according to actual needs.

Figure 7:
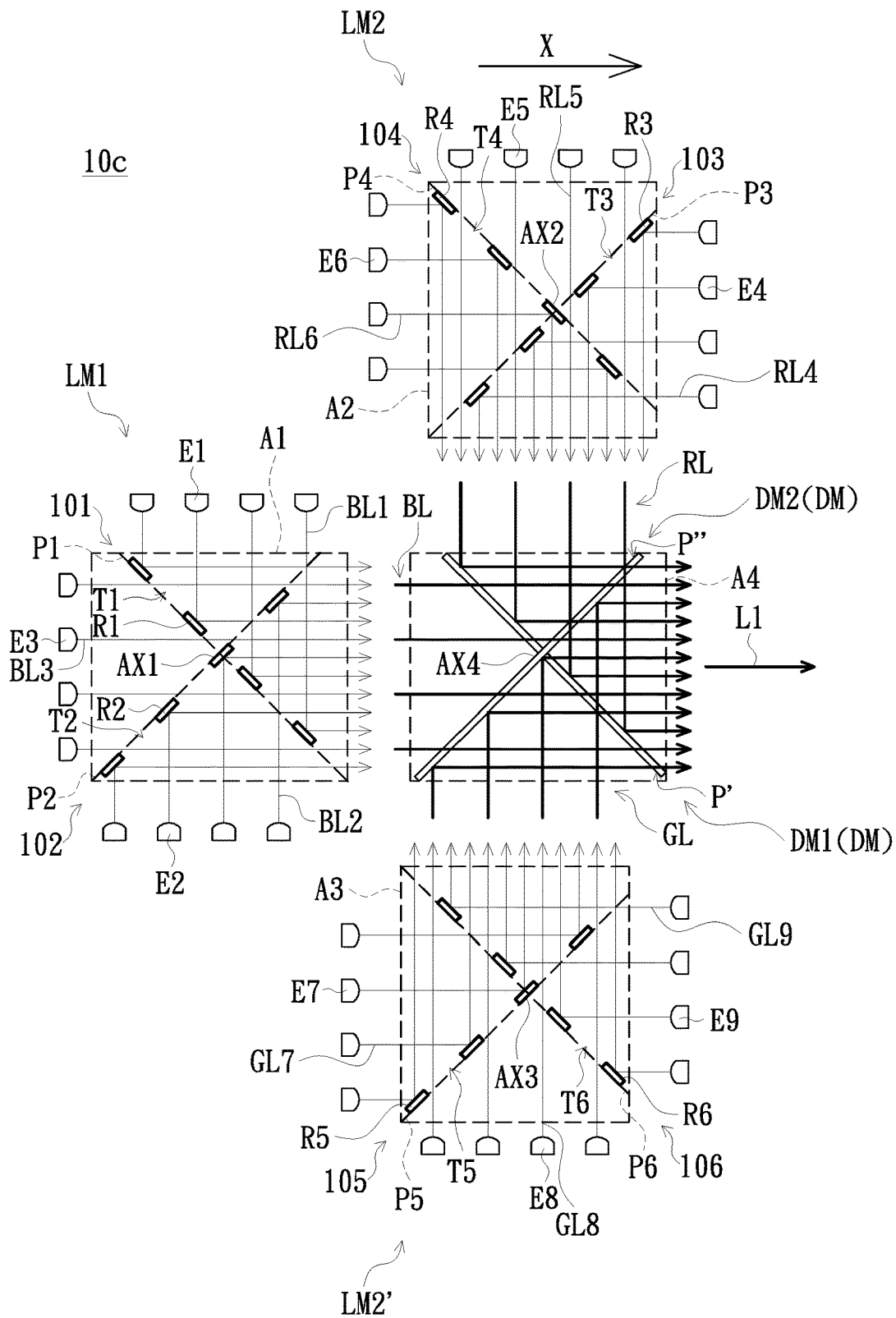

FIG. 7 is a schematic structural view of an illumination system according to another embodiment of the invention. As shown in FIG. 7, the illumination system 10c of the embodiment is similar to the illumination system 10 shown in FIG. 2. The main difference is that the illumination system 10c of the embodiment further includes a first adjustment mechanism A1, a second adjustment mechanism A2, a third adjustment mechanism A3 and a fourth adjustment mechanism A4. The first adjustment mechanism A1 is disposed in the first light source module LM1. The first adjustment mechanism A1 is adapted to adjust the integrating element 101 and the integrating element 102 to rotate along a first axis AX1, wherein the extending direction of the first axis AX1 and the illumination direction X are not parallel to each other. In the embodiment, the extending direction of the first axis AX1 and the illumination direction X are perpendicular to each other. The second adjustment mechanism A2 is disposed in the second light source module LM2. The second adjustment mechanism A2 is adapted to adjust the integrating element 103 and the integrating element 104 to rotate along a second axis AX2, wherein the extending direction of the second axis AX2 and the illumination direction X are not parallel to each other. In the embodiment, the extending direction of the second axis AX2 and the illumination direction X are perpendicular to each other. The third adjustment mechanism A3 is disposed in another second light source module LM2'. The third adjustment mechanism A3 is adapted to adjust the integrating element 105 and the integrating element 106 to rotate along a third axis AX3, wherein the extending direction of the first axis AX3 and the illumination direction X are not parallel to each other. In the embodiment, the extending direction of the third axis AX3 and the illumination direction X are perpendicular to each other. The fourth adjustment mechanism A4 is disposed in the light combining assembly DM. The fourth adjustment mechanism A4 is adapted to adjust the light combining element DM1 and the light combining element DM2 to rotate along a fourth axis AX4, wherein the extending direction of the fourth axis AX4 and the illumination direction X are not parallel to each other. In the embodiment, the extending direction of the fourth axis AX4 and the illumination direction X are perpendicular to each other. It can be seen from the above that the problem of the mechanism tolerance between the integrating element 101 and the integrating element 102 can be solved by the first adjustment mechanism A1; the problem of the mechanism tolerance between the integrating element 103 and the integrating element 104 can be solved by the second adjustment mechanism A2; the problem of the mechanism tolerance between the integrating element 105 and the integrating element 106 can be solved by the third adjustment mechanism A3; and the problem of the mechanism tolerance between the light combining element DM1 and the light combining element DM2 can be solved by the fourth adjustment mechanism A4. Since the above tolerances can be adjusted individually, the overall mounting accuracy can be improved.

Figure 8:
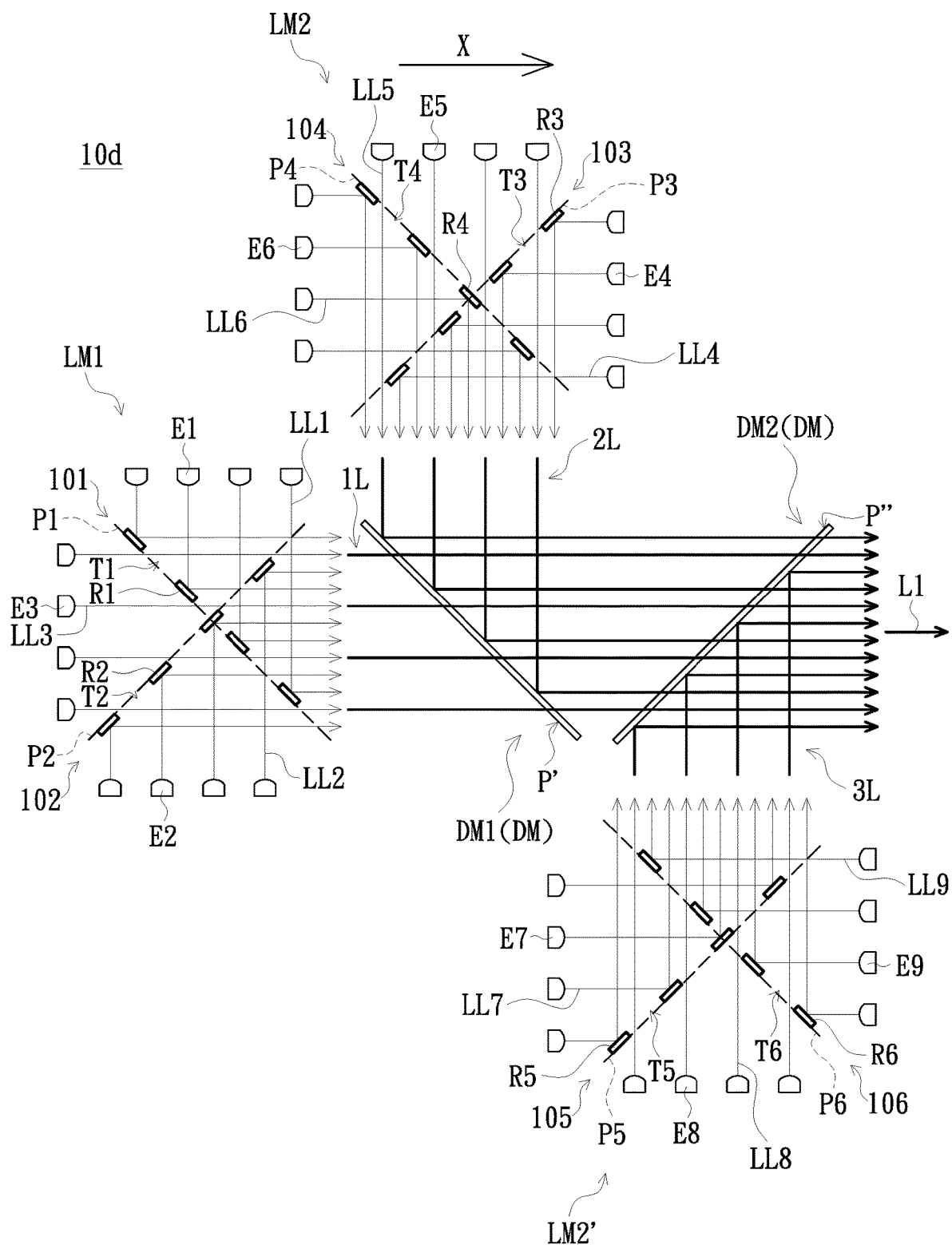

FIG. 8 is a schematic structural view of an illumination system according to another embodiment of the invention. As shown in FIG. 8, the illumination system 10d of the embodiment is similar to the illumination system 10 shown in FIG. 2. The main difference is that the light combining element DM1 and the light combining element DM2 in the light combining assembly DM of the embodiment are separated from each other. In the embodiment, the light combining element DM1 corresponds to the first light source module LM1 and the second light source module LM2, and is located on the transmission path of the color beam 1L from the first light source module LM1 and the color beam 2L from the second light source module LM2. In the embodiment, the light combining element DM1 does not correspond to the second light source module LM2' and is not located on the transmission path of the color beam 3L. In the embodiment, the light combining element DM2 corresponds to the light combining element DM1 and the second light source module LM2, and is located on the transmission path of the color beam 1L and the color beam 2L from the light combining element DM1 and the transmission path of the color beam 3L from the second light source module LM2'.

Figure 9:
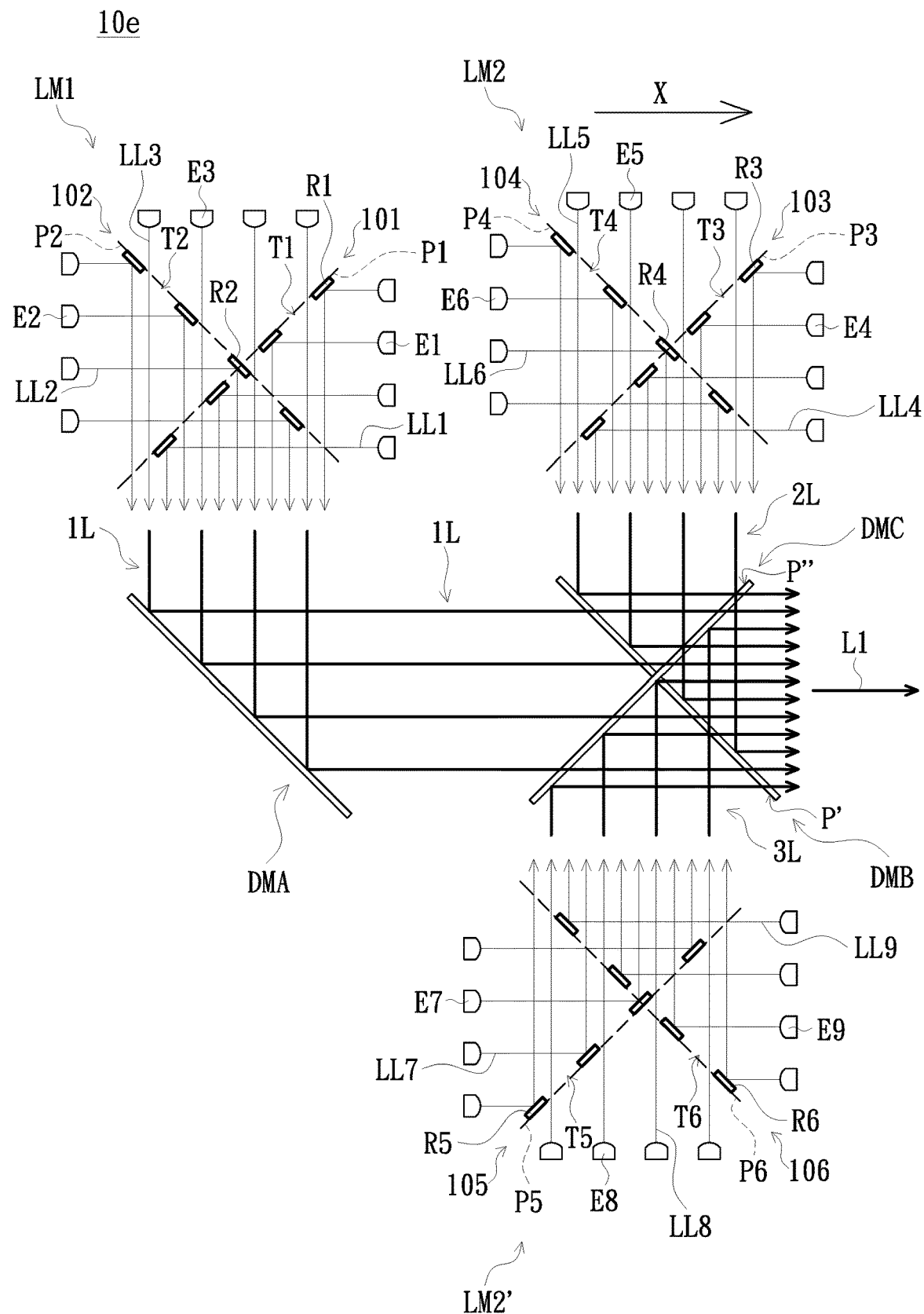

FIG. 9 is a schematic structural view of an illumination system according to another embodiment of the invention. As shown in FIG. 9, the illumination system 10e of the embodiment is similar to the illumination system 10 shown in FIG. 2. The main difference is that the light combining assembly of the illumination system 10e of the embodiment is composed of a light combining element DMA, a light combining element DMB and a light combining element DMC. The light combining element DMA is a reflective element, and the light combining element DMB and the light combining element DMC are two dichroic mirrors. In other embodiments, the light combining element DMB and the light combining element DMC may also be composed of a prism having two dichroic coatings. In the embodiment, the light combining element DMA corresponds to the first light source module LM1 and is located on the transmission path of the color beam 1L from the first light source module LM1. In the embodiment, the light combining element DMA does not correspond to the second light source modules LM2 and LM2', and is not located on the transmission path of the color beam 2L and the color beam 3L. In the embodiment, the light combining element DMB and the light combining element DMC correspond to the light combining element DMA and the second light source modules LM2 and LM2', and are located on the transmission path of the color beam 1L reflected from the light combining element DMA and the transmission path of the color beam 2L and the color beam 3L from the second light source modules LM2 and LM2'.

In summary, the illumination system in the projector of the embodiment of the invention includes a first light source module, at least one second light source module, and a light combining assembly. At least one light source module (first light source module or second light source module) includes two integrating elements and three sets of light emitting elements. The integrating elements respectively have a plurality of light reflecting regions and a plurality of light transmitting regions. The sub-beams respectively emitted by the three sets of light emitting elements are integrated into a single color beam by a design in which the two integrating elements are not parallel to each other. In addition, each of the light source modules and the light combining assembly may be further disposed with an adjustment mechanism to solve the problem that the manufacturing tolerance is difficult to control. The embodiment of the invention can achieve the effect of the densest light accumulation, thereby effectively reducing the volume of the illumination system and the space cost. The illumination system according to the embodiment of the invention has good optical quality, and thus the projection system has good imaging quality. The embodiment of the invention can achieve the color gamut of REC.2020.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first light source module, the second light source module, the first integrating element and the second integrating element are only used for distinguishing various elements and do not limit the number of the elements.

What is claimed is:

1. A projector, comprising an illumination system, a light valve and a projection lens, wherein
the illumination system is adapted to provide an illumination beam, and the illumination system comprises a plurality of light source modules and a light combining assembly,
the light source modules are adapted to provide a plurality of first color beams, a plurality of second color beams and a plurality of third color beams, wherein the light source modules comprise a first light source module and at least one second light source module, wherein
the first light source module is adapted to provide the first color beams, and the first light source module comprises a first integrating element, a second integrating element, a plurality of first light emitting elements, a plurality of second light emitting elements, and a plurality of third light emitting element, wherein
the first integrating element has a plurality of first light reflecting regions and a plurality of first light transmitting regions located in a first plane, and the first light transmitting regions are alternately arranged between the first light reflecting regions,
the second integrating element has a plurality of second light reflecting regions and a plurality of second light transmitting regions located in a second plane, wherein the second plane and the first plane are not parallel to each other, and the second light transmitting region are alternately arranged between the second light reflecting regions,
the first light emitting elements are adapted to respectively provide a plurality of first sub-beams, wherein the first light reflecting regions are located on a transmission path of the first sub-beams,
the second light emitting elements are adapted to respectively provide a plurality of second sub-beams, wherein the second light reflecting regions are located on a transmission path of the second sub-beams,
the third light emitting elements are adapted to respectively provide a plurality of third sub-beams, wherein the first light transmitting regions and the second light transmitting regions are located on a transmission path of the third sub-beams, wherein the first sub-beams, the second sub-beams and the third sub-beams have the same color, and the first color beams comprise the first sub-beams, the second sub-beams and the third sub-beams,
the at least one second light source module is adapted to provide the second color beams and the third color beams, wherein a color of first color beams is different from a color of the second color beams, the color of the first color beams is different from a color of the third color beams, and the color of the second color beams is different from the color of the third color beams,
the light combining assembly is located between the light source modules, wherein the first color beams, the second color beams and the third color beams are guided by the light combining assembly to travel in an illumination direction, so that the first color beams, the second color beams and the third color beams are merged into the illumination beam,
the light valve is located on a transmission path of the illumination beam and is adapted to convert the illumination beam into an image beam,
the projection lens is located on a transmission path of the image beam.

2. The projector according to claim 1, wherein the at least one second light source module comprises:
a third integrating element, having a plurality of third light reflecting regions and a plurality of third light transmitting regions located in a third plane, wherein the third light transmitting regions are alternately arranged between the third light reflecting regions;
a fourth integrating element, having a plurality of fourth light reflecting regions and a plurality of fourth light transmitting regions located in a fourth plane, wherein the fourth light transmitting regions are alternately arranged between the adjacent two fourth light reflecting regions, and the fourth plane and the third plane are not parallel to each other;
a plurality of fourth light emitting elements, adapted to respectively provide a plurality of fourth sub-beams, wherein the third integrating element and the fourth integrating element are located on a transmission path of the fourth sub-beams; and
a plurality of fifth light emitting elements, adapted to respectively provide a plurality of fifth sub-beams, wherein the third integrating element and the fourth integrating element are located on a transmission path of the fifth sub-beams, and the fourth sub-beams and the fifth sub-beams have the same color.

3. The projector according to claim 2, wherein the at least one second light source module further comprises:
a plurality of sixth light emitting elements, adapted to respectively provide a plurality of sixth sub-beams, wherein the third integrating element and the fourth integrating element are located on a transmission path of the sixth sub-beams, wherein the fourth sub-beams, the fifth sub-beams and the sixth sub-beams have the same color.

4. The projector according to claim 2, wherein a number of the at least one second light source module is one, and the second light source module further comprises:
a plurality of sixth light emitting elements, adapted to respectively provide a plurality of sixth sub-beams, wherein the third integrating element and the fourth integrating element are located on a transmission path of the sixth sub-beams, and a color of the sixth sub-beams is different from a color of the fourth sub-beams and the fifth sub-beams.

5. The projector according to claim 2, wherein a number of the at least one second light source module is plural, and the light combining assembly comprises:
a first light combining element, located between the first light source module and the second light source modules and located in a fifth plane; and
a second light combining element, located between the first light source module and the second light source modules and located in a sixth plane, wherein the sixth plane and the fifth plane are not parallel to each other,
wherein the first color beams, the second color beams and the third color beams pass through at least a portion of the first light combining element and at least a portion of the second light combining element in the illumination direction, the second color beams are reflected by the first light combining element to travel in the illumination direction, and the third color beams are reflected by the second light combining element to travel in the illumination direction.

6. The projector according to claim 5, wherein the first light combining element and the second light combining element are both dichroic elements.

7. The projector according to claim 1, wherein the first sub-beams and the second sub-beams respectively form a plurality of light spots on the first light reflecting regions and the second light reflecting regions, a shape of each of the light spots has a long axis and a short axis, an extending direction of the long axes, an extending direction of the first light reflecting regions and an extending direction of the second light reflecting regions are identical to each other.

8. The projector according to claim 1, wherein the first integrating element is perpendicular to the second integrating element.

9. An illumination system, comprising a plurality of light source modules and a light combining assembly, wherein
the light source modules are adapted to provide a plurality of first color beams, a plurality of second color beams and a plurality of third color beams, wherein the light source modules comprise a first light source module and at least one second light source module, wherein
the first light source module is adapted to provide the first color beams, and the first light source module comprises a first integrating element, a second integrating element, a plurality of first light emitting elements, a plurality of second light emitting elements, and a plurality of third light emitting element, wherein
the first integrating element has a plurality of first light reflecting regions and a plurality of first light transmitting regions located in a first plane, and the first light transmitting regions are alternately arranged between the first light reflecting regions,
the second integrating element has a plurality of second light reflecting regions and a plurality of second light transmitting regions located in a second plane, wherein the second plane and the first plane are not parallel to each other, and the second light transmitting region are alternately arranged between the second light reflecting regions,
the first light emitting elements are adapted to respectively provide a plurality of first sub-beams, wherein the first light reflecting regions are located on a transmission path of the first sub-beams,
the second light emitting elements are adapted to respectively provide a plurality of second sub-beams, wherein the second light reflecting regions are located on a transmission path of the second sub-beams,
the third light emitting elements are adapted to respectively provide a plurality of third sub-beams, wherein the first light transmitting regions and the second light transmitting regions are located on a transmission path of the third sub-beams, wherein the first sub-beams, the second sub-beams and the third sub-beams have the same color, and the first color beams comprise the first sub-beams, the second sub-beams and the third sub-beams,
the at least one second light source module is adapted to provide the second color beams and the third color beams, wherein a color of first color beams is different from a color of the second color beams, the color of the first color beams is different from a color of the third color beams, and the color of the second color beams is different from the color of the third color beams,
the light combining assembly is located between the light source modules, wherein the first color beams, the second color beams and the third color beams are guided by the light combining assembly to travel in an illumination direction, so that the first color beams, the second color beams and the third color beams are merged into the illumination beam.

10. The illumination system according to claim 9, wherein the at least one second light source module comprises:
a third integrating element, having a plurality of third light reflecting regions and a plurality of third light transmitting regions located in a third plane, wherein the third light transmitting regions are alternately arranged between the third light reflecting regions;

a fourth integrating element, having a plurality of fourth light reflecting regions and a plurality of fourth light transmitting regions located in a fourth plane, wherein the fourth light transmitting regions are alternately arranged between the fourth light reflecting regions, and the fourth plane and the third plane are not parallel to each other;

a plurality of fourth light emitting elements, adapted to respectively provide a plurality of fourth sub-beams, wherein the third integrating element and the fourth integrating element are located on a transmission path of the fourth sub-beams; and a plurality of fifth light emitting elements, adapted to respectively provide a plurality of fifth sub-beams, wherein the third integrating element and the fourth integrating element are located on a transmission path of the fifth sub-beams, and the fourth sub-beams and the fifth sub-beams have the same color.

11. The illumination system according to claim 10, wherein the at least one second light source module further comprises:

a plurality of sixth light emitting elements, adapted to respectively provide a plurality of sixth sub-beams, wherein the third integrating element and the fourth integrating element are located on a transmission path of the sixth sub-beams, wherein the fourth sub-beams, the fifth sub-beams and the sixth sub-beams have the same color.

12. The illumination system according to claim 10, wherein a number of the at least one second light source module is one, and the second light source module further comprises:

a plurality of sixth light emitting elements, adapted to respectively provide a plurality of sixth sub-beams, wherein the third integrating element and the fourth integrating element are located on a transmission path of the sixth sub-beams, and a color of the sixth sub-beams is different from a color of the fourth sub-beams and the fifth sub-beams.

13. The illumination system according to claim 10, wherein a number of the at least one second light source module is plural, and the light combining assembly comprises:

a first light combining element, located between the first light source module and the second light source modules and located in a fifth plane; and a second light combining element, located between the first light source module and the second light source modules and located in a sixth plane, wherein the sixth plane and the fifth plane are not parallel to each other, wherein the first color beams, the second color beams and the third color beams pass through at least a portion of the first light combining element and at least a portion of the second light combining element in the illumination direction, the second color beams are reflected by the first light combining element to travel in the illumination direction, and the third color beams are reflected by the second light combining element to travel in the illumination direction.

14. The illumination system according to claim 13, wherein the first light combining element and the second light combining element are both dichroic elements.

15. The illumination system according to claim 9, wherein the first sub-beams and the second sub-beams respectively form a plurality of light spots on the first light reflecting regions and the second light reflecting regions, a shape of each of the light spots has a long axis and a short axis, an extending direction of the long axes, an extending direction of the first light reflecting regions and an extending direction of the second light reflecting regions are identical to each other.

16. The illumination system according to claim 9, wherein the first integrating element is perpendicular to the second integrating element.

* * * * *